(12) United States Patent
Bowater

(10) Patent No.: US 7,302,741 B2
(45) Date of Patent: *Dec. 4, 2007

(54) HOSE CLAMP AND SPRING LINER

(75) Inventor: Bruce D. Bowater, Jacksonville Beach, FL (US)

(73) Assignee: Epicor Industries, Inc., St. Augustine, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/649,406

(22) Filed: Jan. 3, 2007

(65) Prior Publication Data

US 2007/0107168 A1    May 17, 2007

Related U.S. Application Data

(63) Continuation of application No. 11/044,939, filed on Jan. 27, 2005, now Pat. No. 7,178,204.

(51) Int. Cl.
*F16L 33/00* (2006.01)

(52) U.S. Cl. ........................................ 24/279; 24/20 R

(58) Field of Classification Search ................ 24/20 R, 24/20 CW, 20 EE, 279; 285/252, 253, 239
See application file for complete search history.

(56) References Cited

U.S. PATENT DOCUMENTS

| | | | | |
|---|---|---|---|---|
| 2,089,940 A | * | 8/1937 | Brown | 285/253 |
| 3,142,881 A | * | 8/1964 | Alva | 24/279 |
| 3,303,669 A | * | 2/1967 | Oetiker | 464/88 |
| 3,315,991 A | * | 4/1967 | Davis | 285/373 |
| 3,429,014 A | * | 2/1969 | Roche | 24/279 |
| 3,537,147 A | * | 11/1970 | Pfeuffer | 24/20 TT |
| 4,308,648 A | | 1/1982 | Fay | 24/274 |
| 4,310,956 A | * | 1/1982 | Meckstroth et al. | 24/279 |
| 4,315,348 A | * | 2/1982 | Oetiker | 24/20 CW |
| 4,667,375 A | * | 5/1987 | Enlund | 24/274 R |
| 5,115,541 A | | 5/1992 | Stichel | 24/20 |
| 5,195,788 A | * | 3/1993 | Oetiker | 285/252 |
| 5,309,607 A | * | 5/1994 | Hohmann et al. | 24/574 R |
| 5,630,255 A | * | 5/1997 | Eliasson | 24/274 R |
| 5,738,359 A | * | 4/1998 | Gundy | 277/606 |
| 6,000,104 A | | 12/1999 | Mann | 24/274 |
| 6,866,301 B2 | * | 3/2005 | Brockway | 285/236 |
| 2005/0138778 A1 | * | 6/2005 | Oetiker et al. | 24/20 R |

* cited by examiner

*Primary Examiner*—Robert J. Sandy
(74) *Attorney, Agent, or Firm*—P. N. Dunlap, Esq.; C. H. Castleman, Esq.; J. A. Thurnau, Esq.

(57) ABSTRACT

An improved hose clamp having an annular band with an inner face, tensioning means, and an annular spring liner. The spring liner includes an outwardly projecting circumferential ridge; an inwardly projecting circumferential ridge on each side of the outwardly projecting ridge; and a circumferential shoulder near each circumferential edge of the spring liner; and the shoulders are adapted to abut the inner face of the annular band in the absence of clamp tensioning forces. The outwardly projecting ridge may or may not abut the inner face in the presence of clamp tensioning forces.

19 Claims, 1 Drawing Sheet

HOSE CLAMP AND SPRING LINER

CROSS REFERENCE TO RELATED APPLICATION

This application is a continuation of application Ser. No. 11/044,939 filed Jan. 27, 2005 now U.S. Pat. No 7,178,204.

BACKGROUND OF THE INVENTION

This invention relates to the field of hose clamp assemblies, more particularly, this invention relates to a spring liner that is associated with a hose clamp assembly, and allows the hose clamp to self-compensate for changes in elastic properties and diametric changes of the underlying hose and fittings.

Hose clamps are commonly utilized to join together hoses and fittings or connectors (referred to hereinafter as fittings), for example, within the automotive industry. Hose clamps, hose and fittings respond to changes in ambient temperature and system temperatures based on the thermal properties of the aforementioned components. Differing coefficients of thermal expansion of these components can result in thermally induced reductions in clamping force, thus creating the potential for fluid or gas leakage. In addition, changes in elasticity of the hose materials over time due to creep, compression set, or deterioration can also reduce the clamping force and create the potential for fluid leakage.

Various types of spring liners used in conjunction with hose clamps are known. U.S. Pat. No. 6,000,104 discloses an annular insert band having two end sections that extend in the circumferential direction and overlap one another. One of the end sections may be shaped as a corrugated spring, which creates a spring force that tends to re-tension the clamp. The insert band may have resilient, corrugated tabs that project radially inward and create some additional re-tensioning force. This spring liner has two deficiencies. First, the insert band is flat so that hose material is squeezed out from under it as it is tightened circumferentially. Second, the axial corrugations and tabs create circumferentially non-uniform and localized forces, which are not well-suited to prevent fluid leakage.

U.S. Pat. No. 4,667,375 discloses an annular resilient insert band provided with two axially spaced inwardly directed peripheral beads which extend around the band. In between the two beads is an outwardly directed ridge in abutment with the inner face of the tensioning band of the clamp. As the clamp is tensioned or tightened, the beads are supposed to help to prevent the outward flow of the hose material, and the beads are supposed to deflect to provide a re-tensioning force. According to subsequent U.S. Pat. No. 5,630,255, the prior two-bead design ('375) failed to serve its intended function. The '255 patent sought to improve the movability of the beads in the radial and axial direction by adding a number of openings in the outwardly directed ridge. However, the abutment of the outward ridge against the inner face of the tensioning band was retained.

What is needed is a circumferentially corrugated insert spring liner for a hose clamp providing improved initial and long term sealing effect over that obtained with prior art hose clamp liner designs.

BRIEF SUMMARY OF THE INVENTION

Accordingly, it is an aspect of the present invention to provide an improved annular circumferentially corrugated spring liner for a hose clamp having a central outwardly directed circumferential ridge; an inwardly directed circumferential ridge on each side of the central ridge; and a circumferential shoulder near each edge; Wherein the hose clamp seats on the shoulders when the clamp is tensioned. Thus, at least after assembly, and before tensioning of the hose clamp, the central ridge is separated from the inner face of the tensioning band of the hose clamp by a gap.

It is another aspect of the present invention to provide an improved hose clamp assembly having an annular band having an inner face, a tensioning means disposed to facilitate constriction of the band, and an annular spring liner; the spring liner having an outwardly projecting circumferential ridge; an inwardly projecting circumferential ridge on each side of the outwardly projecting ridge; and a circumferential shoulder near one or each edge of the spring liner; wherein the spring liner is adapted so that at least one shoulder abuts the inner face of the annular band.

In another embodiment of the invention, the spring liner further has on one or both circumferential edges a radially outwardly flared flange.

The above and other features and advantages of the invention will be apparent from the following detailed description.

BRIEF DESCRIPTION OF THE DRAWINGS

wherein like parts are given like numerals.

DETAILED DESCRIPTION OF THE INVENTION

Figure 1:
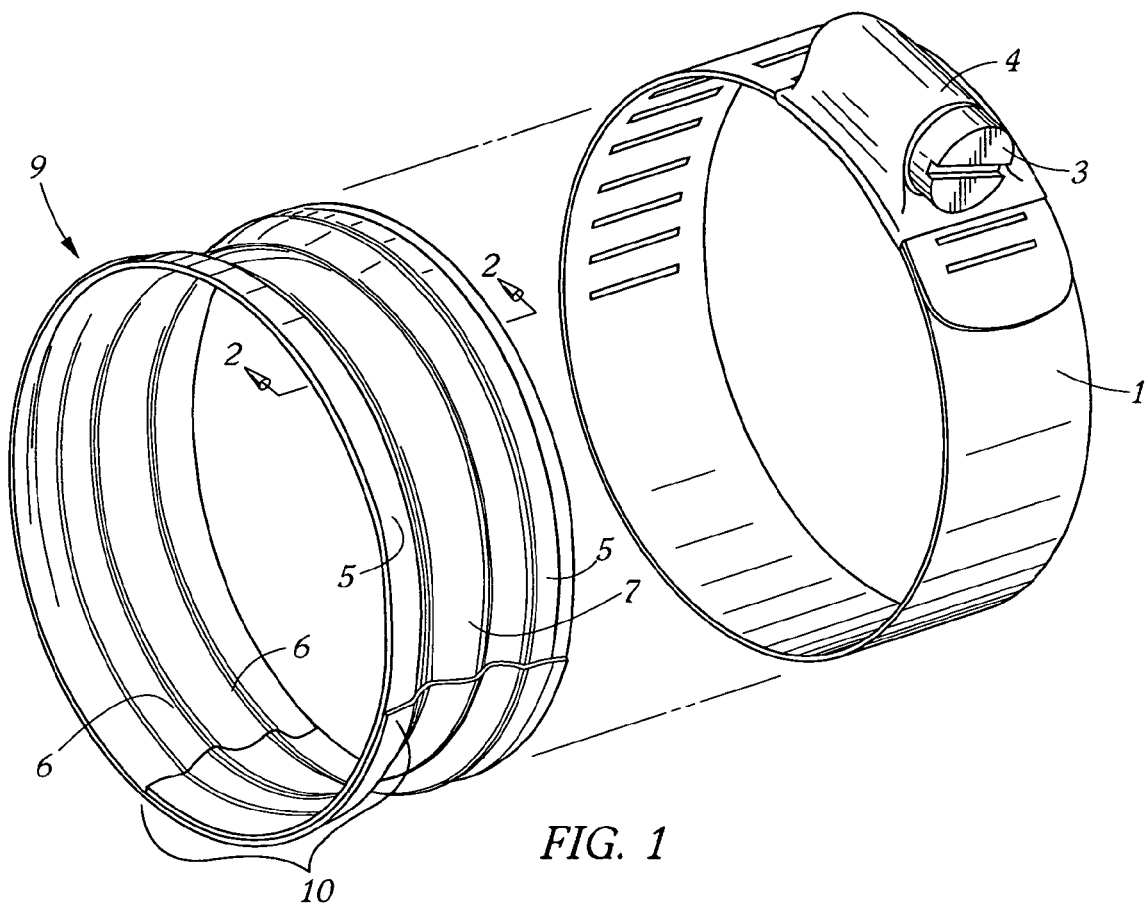
FIG. 1 is a perspective exploded view of a hose clamp assembly including clamp and spring liner in accordance with an embodiment of the present invention.
Figure 2:
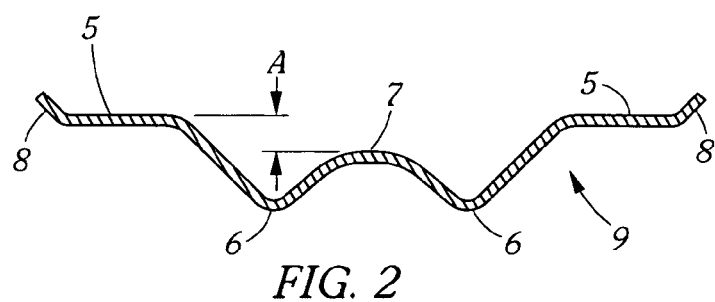
FIG. 2 is a partial sectional view of the spring liner of FIG. 1, taken along section 2-2.

Referring to FIG. 1, a hose clamp is shown comprising an outer annular band 1, and a typical tensioning means 3, 4. FIG. 1 also shows in exploded view a wavy spring liner 9 in accordance with the present invention. Spring liner 9 is also shown in section in FIG. 2. Spring liner 9 is a circumferentially corrugated annular ring with overlapping ends 10. Spring liner 9 comprises two annular circumferential shoulders 5 near the edges of the liner, two radially inwardly directed annular circumferential ridges 6 there between, and a radially outwardly directed central annular circumferential ridge 7 located between the two inward ridges 6. FIG. 2 shows a radial height differential A between the two shoulders 5 and the central outwardly directed ridge 7. When the liner 9 is inserted into the clamp band 1, the inner face of the band 1 will abut or seat on the shoulders 5, and a gap A will result between the ridge 7 and the inner face of the band 1.

The terms outward and inward refer to direction with respect to the center axis of the generally circular liner. Inward means directed toward the center axis of the liner. Outward means directed away from the center axis of the liner. Circumferentially corrugated refers to series of folds or waves having ridges that extend around the circumference of the liner, and thus refers to waviness in the axial direction.

Figure 3:
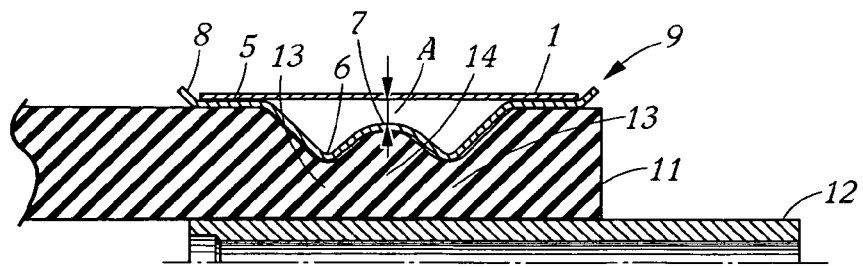
FIG. 3 is a partial sectional view of a hose clamp assembly including spring liner, hose, and fitting in accordance with an embodiment of the present invention.

Upon tightening or tensioning of the band, the overlap section 10 of the liner can increase in length, resulting in a decrease in the circumference of the liner. As the band tightens, the liner is thus pulled into compressive engagement with the associated hose. FIG. 3 illustrates the hose clamp assembly in use with a hose 11 and a hose fitting 12. The band 1 of the hose clamp seats on the two shoulders 5. The two inward ridges 6 of the liner create two zones of very high compression 13 in the hose, while the central ridge area 7 creates a zone of lesser compression 14.

The profile of the liner is designed so that the two inward ridges, two shoulders, and the central outward ridge can deflect under the compressive forces. As the band is tensioned, the radial deflection will cause the gap A to decrease to A' (A'≦A), or perhaps even disappear completely. As the band is tensioned, the deflection will also cause the two inward ridges to move slightly closer together axially. This movement produces a slight axial compression of the hose portion in the central ridge region 14. The decrease in gap is an indication of the amount of spring energy stored in the annular spring liner. The net effect of these radial and axial deflections and the resulting compression forces on the hose is a much better initial and long term sealing effect than obtained with prior art hose clamp liner designs.

As the hose and clamp assembly is exposed to thermal fluctuations, the spring liner can respond by further deflecting or by relaxing, thus helping to maintain an excellent sealing force on the hose assembly. As the hose material, which is typically vulcanized rubber, takes on a compression set, or inelastic deformation, due to deterioration of elastic properties over time, the force exerted by the rubber will relax or decline, and the spring liner again relaxes or releases some of the stored spring energy, thus maintaining an excellent sealing force on the hose. The central ridge region 14 of the clamped hose, being under reduced compressive force, will generally exhibit reduced compression set, or less property deterioration with time, compared to regions 13. This, combined with the compressive effect and stored spring energy describe above, helps the center ridge area 14 contribute to improved sealing performance over time.

If the hose clamp is tensioned to the extent that the gap A' is eliminated and ridge 7 contacts the inner surface of the band 1, then any further deflection of the spring liner requires much higher forces, commensurate with a dramatic increase in spring rate. Under this condition, the deflection of the spring liner in response to thermal expansion of the hose is very limited. However, under this condition, the spring liner's ability to relax or respond to thermal contraction of the hose is maximized. Thus the clamp and spring liner may be designed so that in use a gap A' is maintained even in the presence of clamp tensioning forces. Alternately, the clamp and spring liner may be designed so that in use the outwardly projecting ridge 7 may abut the inner face of the hose clamp 1 in the presence of clamp tensioning forces.

As shown in FIGS. 1 through 3, the spring liner 9 may have one or two radially outward flared flanges 8 to aid in aligning the liner 9 within the band 1. The flanges shown in the figures flare outward at about a 45° angle. Any suitable flare angle or flare shape may be used. The flanges 8 may extend the entire circumference of the liner or may be cut short in appropriate places to reduce interference in the overlap section 10 of the liner or to reduce interference between the liner and the tensioning means 3, 4. Alternately, or in addition to a flange, the spring liner may be more or less permanently affixed to the band 1 by any means that provides an adequate bond, such as, but not limited to, heat welding, chemical welding, chemical bonding, staking, mechanical fasteners, or a combination of two or more of the foregoing.

The spring force exerted by the liner depends on the thickness and modulus of the material of which it is constructed. The force also depends on the precise wavy profile, i.e. the shape and size of the ridges and shoulders. The profile shown in FIG. 2, when formed out of sheet metal about 0.012 inches (0.3 mm) thick, is suitable for typical automotive hose clamping applications. One skilled in the art would be able to alter the materials, material properties, shoulder and ridge dimensions, flange angles, overlap distance, and/or spring liner thickness to optimize the wavy spring liner for particular applications. The profile need not be perfectly symmetric. The two inward ridges and the central outward ridge may all be of different shapes or sizes. The central outward ridge need not be at the exact center of the annular liner. The thickness of the liner may also vary in the axial direction.

The shoulders need not be broad, flat structures. A shoulder or shoulders may be a circumferential line of contact adapted to abut the inner face of the band of the hose clamp. Such a shoulder could be an outwardly convex ridge formed near the edge of the liner, or it could simply be an edge of the liner. The important feature of the shoulder is that it be adapted to contact or abut the inner face of the band of the hose clamp. Viewed in section as in FIG. 3, the contact between the inner face of the band 1 and the shoulder 5 could therefore be a point or a line. In three dimensional terms, the contact between the inner face of the band 1 and the shoulder 5 could therefore be a circular line or a cylindrical area, depending on the shape of the shoulder.

Friction between the overlapping ends of the wavy spring liner can affect the clamping force achieved during assembly. To reduce the friction force, the overlapping ends may be coated with wax or other suitable lubricant. To increase the friction force, the overlapping section may be cleaned, roughened, grooved, knurled, or the like. Thus, one skilled in the art can optimize the friction as needed or desired.

Any of the various hose clamp tightening or tensioning means known in the art may be used. By way of illustration, the tensioning mechanism may be a worm drive 3, 4 as shown in FIG. 1. Alternatively, the tensioning means may be a T-bolt, a ratcheting mechanism, a bolt and barrel mechanism, a nut and bolt assembly, a permanent crimp, or the like, or combinations thereof. Alternatively, the clamp may be an endless band with thermally frozen-in strain, which is tensioned by releasing the strain and allowing the band to shrink onto the spring liner, hose and fitting.

Other known features of hose clamps may be incorporated if desired without departing from the scope of the invention. For example, various means of attaching the assembly to the hose, such as adhesive, a vulcanizing patch, a locating tab, a locating clip, and the like may be incorporated. Cutouts or apertures for adjusting spring stiffness, or the like may be incorporated.

A conventional hose clamp exerts radial pressure proportional to the tension in the band. The radial pressure is nearly uniform throughout the width and circumference of a conventional flat band. Exceptions to this uniformity are at the edge of the band and at any high and low points due to the construction of the clamp. As conventional hose clamps are tightened over a hose, the increasing radial pressure causes the hose material to "flow" out from under the clamp, thus reducing the clamping force. This movement of hose material is referred to as cold flow. Cold flow, along with temperature and pressure, also negatively impacts compression set, or the inelastic or permanent deformation of the hose under the clamp.

On the other hand, the radial pressure exerted by the clamp with the inventive annular spring liner is non-uniform in the axial direction. The radial pressure under the two inwardly directed ridges is substantially higher than the area under the central outwardly directed ridge. The two inward ridges on the wavy liner generate high pressure, trapping hose material between them, and impeding the flow of hose material from under the clamp, thus reducing the impact of cold flow on compression set and ultimately increasing sealing efficiency.

In actual practice, a hose clamp with an annular spring liner is placed over the hose and fitting to be joined. Clamp diameter is reduced by means of the tensioning mechanism. Spring liner diameter is reduced proportionally to the clamp diameter reduction by increasing the circumferential overlap length of the liner. As the combined hose clamp and annular spring liner diameters decrease, radial pressure acting on the underlying hose and fitting increase. As the radial pressures increase as a result of adjusting the tensioning device, the high pressure differential traps hose material between the two inward circumferential ridges. This pressure differential impedes further cold-flow of hose material from under the clamp as the joint is subject to thermal cycling.

As the radial forces acting on the spring liner increase as a result of increased tension in the outer band, the spring liner deflects in such a manner that the shoulders 5 deflect downward towards the hose 11. This movement can continue until the desired tension is achieved. However, the movement becomes more limited at the point where the central convex ridge 7 contacts (if ever) the inner face of the clamp band 1. The deflections are elastic, spring-like behavior. Therefore, the liner can respond to variations in band tension, and/or radial pressures as a spring. This spring behavior insures that the two annular inward ridges exert sufficient radial pressure on the hose throughout the life of the clamp installation.

Although a specific preferred embodiment has been described with reference to the accompanying drawings herein, it is to be understood that the invention is not limited to that precise embodiment, and that various changes and modifications may be effected by one skilled in the art without departing from the scope or spirit of the invention as defined in the appended claims. Moreover, the invention illustratively described herein may be practiced in the absence of any element that is not specifically disclosed herein.

What is claimed is:

1. A hose clamp having an inner face and an annular spring liner, said spring liner comprising:
   an outwardly projecting circumferential ridge;
   an inwardly projecting circumferential ridge on each side of said outwardly projecting ridge; and
   a circumferential shoulder near each edge of said liner;
   wherein said shoulders are adapted to abut said inner face in the absence of clamp tensioning forces, and said outwardly projecting ridge does not abut said inner face in the absence of clamp tensioning forces.

2. The hose clamp of claim 1 wherein there is a radial height differential between said outwardly projecting ridge and said shoulders in the absence of clamp tensioning forces.

3. The hose clamp of claim 2 wherein said outwardly projecting ridge may or may not abut said inner face in the presence of clamp tensioning forces.

4. The hose clamp of claim 1 further comprising a gap between said outwardly projecting ridge and said inner face in the absence of clamp tensioning forces.

5. The hose clamp of claim 4, wherein said gap decreases in size in the presence of clamp tensioning forces.

6. The hose clamp of claim 4 wherein said liner deflects elastically under clamp tensioning forces so that said gap varies with said clamp tensioning force.

7. An annular circumferentially corrugated spring liner, having a hose clamp having an inner face, said spring liner comprising:
   a central outwardly convex circumferential ridge;
   a gap between said central ridge and said inner face in the absence of clamp tensioning forces;
   an inwardly convex circumferential ridge on each side of said central ridge; and
   a circumferential shoulder near each edge of said liner;
   wherein said liner has generally circular shape with overlapping ends;
   wherein said shoulders are adapted to abut said inner face in the absence of clamp tensioning forces; and
   wherein said gap decreases and may disappear in the presence of clamp tensioning forces.

8. The spring liner of claim 7, further comprising on at least one edge a radially outwardly flared flange.

9. The spring liner of claim 8 wherein said flange extends a portion or portions of the circumference of the liner.

10. The spring liner of claim 7, further comprising on each circumferential edge a radially outwardly flared flange.

11. A hose clamp comprising: an annular band having an inner face, tensioning means, and an annular spring liner; said spring liner comprising:
    an outwardly projecting circumferential ridge;
    an inwardly projecting circumferential ridge on each side of said outwardly projecting ridge; and
    a circumferential shoulder near each edge of said spring liner;
    wherein said shoulders are adapted to abut said inner face in the absence of clamp tensioning forces, and said outwardly projecting ridge does not abut said inner face in the absence of clamp tensioning forces.

12. The hose clamp of claim 11, wherein there is a radial height differential between said outwardly projecting ridge and said shoulders in the absence of clamp tensioning forces.

13. The hose clamp of claim 12, wherein said outwardly projecting ridge may or may not abut said inner face in the presence of clamp tensioning forces.

14. The hose clamp of claim 13, further comprising on each circumferential edge of said liner a radially outwardly flared flange.

15. The hose clamp of claim 13, further comprising on at least one edge of said liner a radially outwardly flared flange.

16. The hose clamp of claim 15 wherein said flange extends a portion or portions of the circumference of the liner.

17. The hose clamp of claim 11, further comprising a gap between said outwardly projecting ridge and said inner face in the absence of clamp tensioning forces.

18. The hose clamp of claim 17, wherein said gap decreases in size in the presence of clamp tensioning forces.

19. The hose clamp of claim 17, wherein said liner deflects elastically under clamp tensioning forces so that said gap varies with said clamp tensioning force.

* * * * *